United States Patent [19]

Kimura et al.

[11] Patent Number: 5,428,454
[45] Date of Patent: Jun. 27, 1995

[54] VIDEO SIGNAL RECORDING/REPRODUCING APPARATUS

[75] Inventors: Masatoshi Kimura; Shinichi Masuda, both of Hyogo, Japan

[73] Assignees: Mitsubishi Denki Kabushiki Kaisha; Mitsubishi Electric Engineering Co., Ltd., both of Tokyo, Japan

[21] Appl. No.: 264,586

[22] Filed: Jun. 23, 1994

Related U.S. Application Data

[63] Continuation of Ser. No. 25,402, Feb. 26, 1993, abandoned.

[30] Foreign Application Priority Data

Feb. 28, 1992 [JP] Japan .................. 4-043059

[51] Int. Cl.⁶ .................. H04N 5/76; H04N 7/01
[52] U.S. Cl. .................. 358/335; 360/33.1; 348/445
[58] Field of Search .............. 358/335, 310, 906, 342; 348/441, 445, 913, 903, 904; 360/33.1; H04N 5/76, 5/78, 5/781, 5/765, 11/20, 11/24, 7/01, 5/225, 9/79

[56] References Cited

U.S. PATENT DOCUMENTS

| | | | |
|---|---|---|---|
| 4,845,564 | 7/1989 | Hakamada et al. | 358/181 |
| 4,931,855 | 6/1990 | Salvadorini | 358/12 |
| 4,984,081 | 1/1991 | Miyoshi et al. | 358/181 |
| 5,003,403 | 3/1991 | Hashimoto et al. | 358/310 |
| 5,122,885 | 6/1992 | Yoshioka et al. | 358/310 |
| 5,150,218 | 9/1992 | Ezaki | 358/310 |
| 5,223,944 | 6/1993 | Shimada et al. | 358/330 |

FOREIGN PATENT DOCUMENTS

| | | | |
|---|---|---|---|
| 3148969 | 6/1991 | Japan | H04N 5/225 |
| 3148970 | 6/1991 | Japan | H04N 5/225 |

OTHER PUBLICATIONS

Itoga et al. "MUSE/NTSC Converter" IEEE Transactions on Consumer Elec. vol. 35, No. 3 Aug. 1989, pp. 142–151.
The English Translation of JP 3-148970, Jun. 25, 1991.

Primary Examiner—Tommy P. Chin
Assistant Examiner—Thai Tran
Attorney, Agent, or Firm—Lowe, Price, LeBlanc & Becker

[57] ABSTRACT

The apparatus includes a standards conversion circuit for converting a video signal of MUSE standard having an aspect ratio of 16:9 to be applied to an input terminal into a video signal of NTSC standard having an aspect ratio of 4:3 so that no drop out of the video image is generated and no empty space is generated in the video image and outputting the resultant signal through an output terminal. The video signal output from standards conversion circuit includes a deformation of the image originated from the difference in the aspect ratios. The video signal recording/reproducing apparatus further includes a circuit for recording the video signal of NTSC standard applied from standards conversion circuit on a recording medium and reproducing the same from the recording medium, and a vertical filter circuit for restoring the correct image by the video signal of NTSC standard by processing the video signal reproduced by recording/reproducing circuit and removing the deformation of the image due to the difference in the aspect ratios.

27 Claims, 12 Drawing Sheets

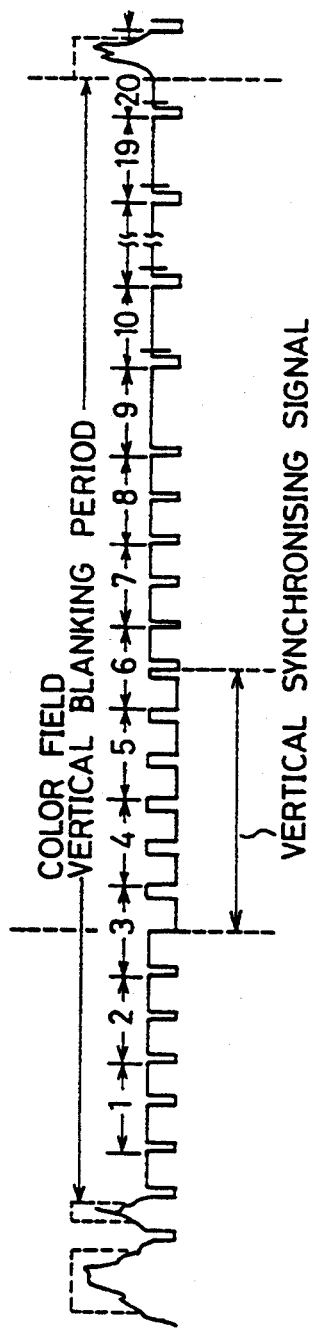
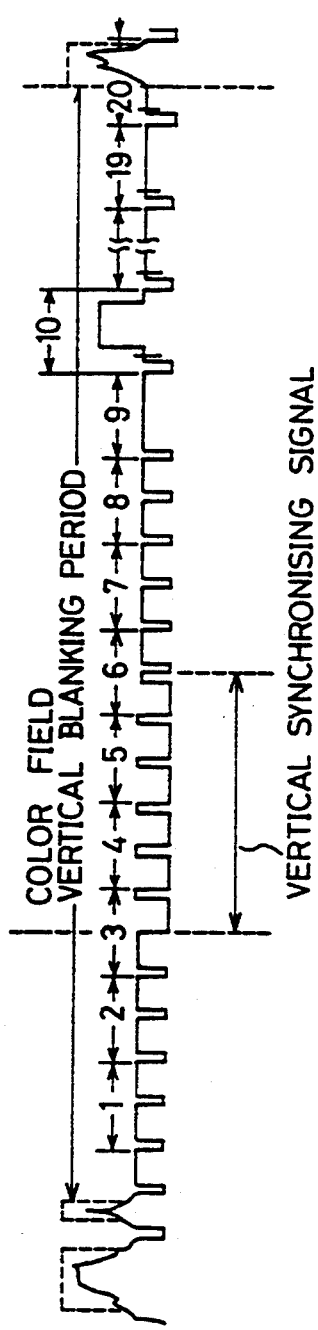
FIG. 15(a)
FIG. 15(b)

VIDEO SIGNAL RECORDING/REPRODUCING APPARATUS

This application is a continuation of application Ser. No. 08/025,402 filed Feb. 26, 1993 now abandoned.

BACKGROUND OF THE INVENTION

1. Field of the Invention

The present invention relates generally to video signal recording/reproducing apparatuses having a built-in television standards converter, and more specifically, to a video signal recording/reproducing apparatus for standards conversion which requires aspect ratio conversion.

2. Description of the Related Art

In recent years, high definition television systems have been in the stage for practical application. The high definition television systems are not basically compatible with the existing television standards (such as NTSC and PAL). However, receivers, recording/reproducing apparatuses and the like dedicated to high definition television standards have hardly come into wide use, while for the existing television standards are widely spread such that almost everyone has at least one television set in his or her home. Therefore, a video signal recording/reproducing system has been advised by the present inventors, which includes therein television standards converter for converting a high definition television standard signal into an existing television standard signal. As an example, a converter will be described which converts a high definition television signal according to the MUSE (Multiple Sub-Nyquist Sampling Encoding) standard developed by NHK (Nippon Hoso Kyokai) into a television signal according to the existing NTSC standard. It is noted that a high definition television system generally has an aspect ratio greater than those for the existing television systems (referred to as wide aspect ratio). For example, the aspect ratio is 4:3 according to the NTSC standard, while the aspect ratio of a video image carried by a MUSE signal is 16:9.

Referring to FIG. 1, a conventional video signal recording/reproducing system includes a television standards converter 182 for converting a MUSE signal 188 into a picture image of an NTSC signal, and a recording/reproducing apparatus 184 of NTSC standard for recording the NTSC signal output from television standards converter 182 on a magnetic tape 200 utilizing a rotary head mounted to a rotary drum 198 and reproducing the recorded signal. A reproduced NTSC signal 194 output from recording/reproducing apparatus 184 can be displayed as it is at a television receiver 186.

Television standards converter 182 includes a MUSE/NTSC signal processing circuit 190 for performing a de-emphasis processing to an input MUSE signal, a time-base conversion processing from the MUSE signal to an NTSC signal, and a thinning processing of scan lines, thereby converting the MUSE signal into an NTSC signal, and a vertical filter 192 for performing a prescribed processing to the NTSC signal output from MUSE/NTSC signal processing circuit 190, eliminating the deformation of the image of the NTSC signal output from circuit 190, and producing a video signal permitting of displaying the resultant image in a normal form on a picture frame of NTSC standard. Vertical filter 192 is provided with an aspect ratio selection switch 196 for selecting either matching the aspect ratio of the image to the image of the original MUSE signal or to that of the image of the NTSC signal, when the deformation of the image is removed away.

The apparatus shown in FIG. 1 operates as follows. Referring to FIG. 2, the MUSE signal 188 input to MUSE/NTSC signal processing circuit 190 produces a picture frame A at an aspect ratio of 16:9. As described above, MUSE/NTSC signal processing circuit 190 performs the de-emphasis processing to the MUSE signal, the time-base conversion processing, the thinning of scan lines and the like, thereby compressing the picture frame horizontally as illustrated in FIG. 2, and a video signal having an aspect ratio of 4:3 is output as a result. Such a picture frame horizontally compressed and having the aspect ratio of 4:3 will be referred to as compressed entire picture frame display. The image signal of the compressed entire picture frame display B has been converted to an NTSC signal and when applied and displayed at a television system as it is, as illustrated in FIG. 2, what has been a true circle in the original picture frame A is deformed into a longwise ellipse. The deformation must therefore be eliminated.

The vertical filter 192 is provided for eliminating the deformation. There are two ways of elimination. The first way is to eliminate the deformation by cutting away both sides of the compressed entire picture frame display B and expanding the central portion of the image in the horizontal direction. The second way is to eliminate the deformation by compressing the picture frame in the vertical direction without cutting the both sides, as illustrated in a picture D in FIG. 2. In the latter, a thinning processing of scan lines or the like is performed.

The signals processed as the picture frames C and D are recorded on magnetic tape 200 at recording/reproducing apparatus 184 in FIG. 1.

Reproduction is performed in the same manner as usual reproduction of an NTSC signal. More specifically, recording/reproducing apparatus 184 reproduces the NTSC signal recorded on magnetic tape 200. The reproduced NTSC signal 194 is applied to television receiver 186 and the picture frame C or the picture frame D shown in FIG. 2 is displayed as a result.

Among conventional systems, if the side-cut display C (see FIG. 2) is recorded on a magnetic tape, data on cut-away portions on both sides of the image drops out. The entire original image cannot be reproduced at the time of reproduction. In high definition television programs, some information is usually displayed at the right and left edges of a picture frame, naturally taking into account the wide aspect ratio. It is not desirable that the information on both sides drops out as such and cannot be reproduced.

In contrast, in a system utilizing the entire picture frame display D, the problem described above is not encountered. However, portions with no video image in the upper and lower parts of a picture frame are included in a signal to be recorded. In view of efficiency, recording portions with no image as this is to waste a part of the recording medium. It is more preferable to eliminate such a waste.

SUMMARY OF THE INVENTION

It is therefore an object of the invention to provide a video signal magnetic recording/reproducing apparatus permitting recording of a video signal at a high efficiency and reproducing it in a correct form substantially including all the information of an original image, in an apparatus for recording/reproducing, by converting a video signal of a first television standard into a video signal of a second television standard having a different aspect ratio from the first standard.

Another object of the invention is to provide a video signal magnetic recording/reproducing apparatus permitting recording of a video signal of a first television standard and a video signal of a second television standard having a different aspect ratio from the first standard both at a high efficiency and automatic reproduction of them in a correct form substantially including all the information of an original image.

A video signal recording/reproducing apparatus according to the invention has an input terminal and a first output terminal, and includes a standards converting circuit for converting a video signal of a first television standard having a first aspect ratio applied to the input terminal into a video signal of a television standard having a second aspect ratio different from the first aspect ratio so that substantially no drop out is produced in the video image and no empty space is produced in the video image and outputting the resultant signal through the first output terminal. A video signal output from the standards converting circuit includes deformation of the image due to the difference in the aspect ratios. The video signal recording/reproducing apparatus further has an input terminal connectable to the first output terminal of the standards converting circuit and includes a circuit for recording the video signal of the second aspect ratio applied to the input terminal on a recording medium and reproducing the same from the recording medium, and a circuit for restoring a correct image according to the video signal of the television standard having the second aspect ratio by processing the video signal reproduced by the recording and reproducing circuit, thereby eliminating the deformation of the image due to the difference in the aspect ratios.

Although the image deformation originated from the difference in the aspect ratios is included in the recording medium, a video signal including substantially all the information of the original image is recorded thereon. At the time of reproduction, the correct video image can be recovered by the restoring circuit of the image. Furthermore, the video signal recorded on the recording medium does not include an empty space and therefore the recording medium will not be wasted.

The video signal of the first aspect ratio may be a signal of the MUSE standard. The video signal of the second aspect ratio may be a signal of the NTSC standard.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a waveform chart showing a determination signal time-division multiplexed in the second embodiment of the invention.

DESCRIPTION OF THE PREFERRED EMBODIMENTS

In the following embodiments, an apparatus is described for recording/reproducing by converting a MUSE signal into a video signal of the existing NTSC standard, but the invention is not limited thereto and can be applied to conversion between other television standards.

Figure 3:
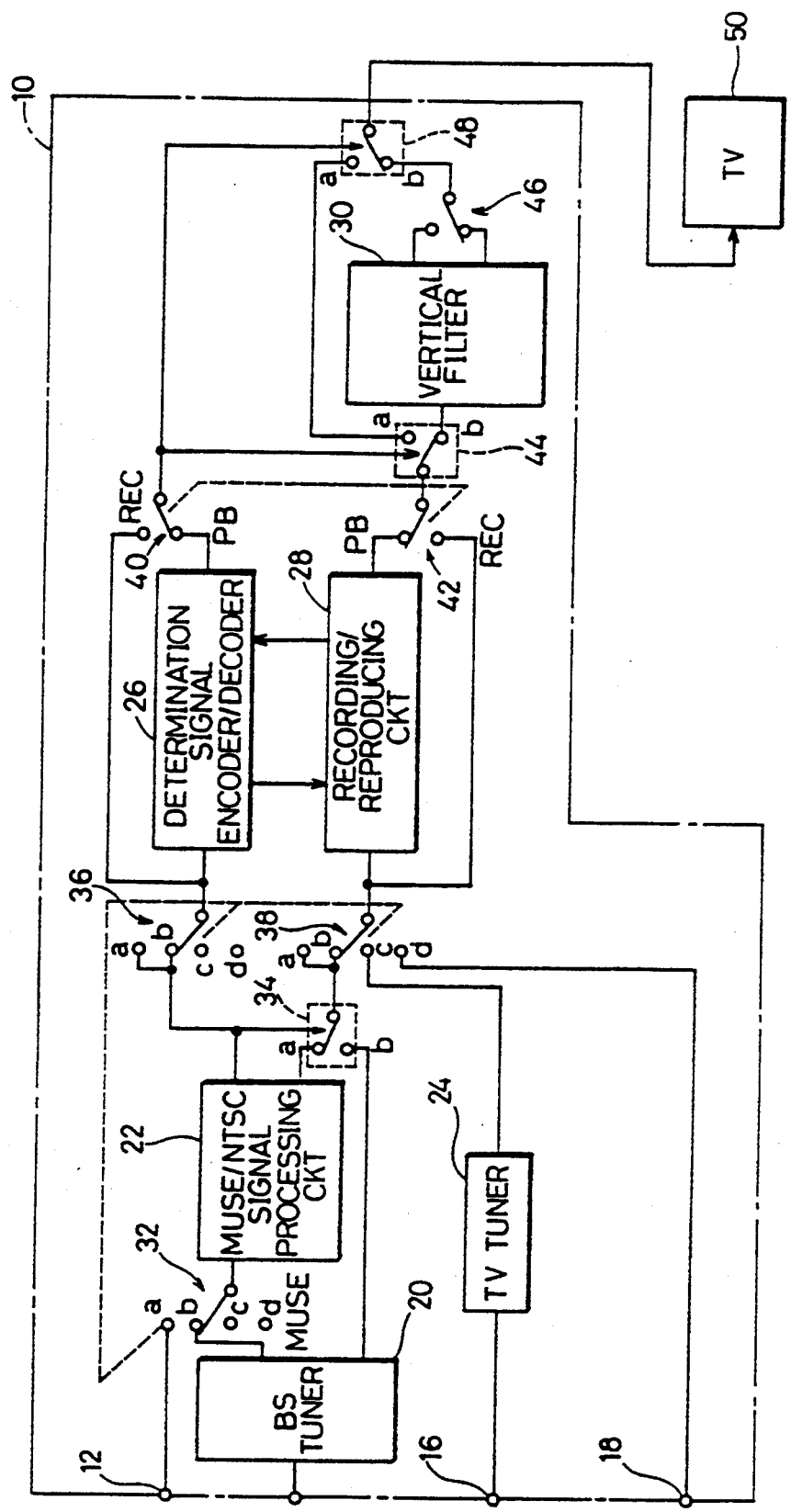
FIG. 3 is a block diagram showing a video signal recording/reproducing apparatus according to a first embodiment of the invention.

Referring to FIG. 3, a magnetic recording/reproducing apparatus 10 according to one embodiment of the invention includes an external input terminal 12 for a MUSE signal, a satellite broadcasting antenna input terminal 14, a ground wave antenna input terminal 16, an external input terminal 18 for an NTSC signal. Among these terminals, the MUSE and NTSC signals are input to terminal 14 and the NTSC signal is input to terminal 16.

Magnetic recording/reproducing apparatus 10 further includes a BS (Satellite Broadcasting) tuner 20 having an input connected to terminal 14 for separately outputting a selected one of the MUSE signal and NTSC signal in response to an operation of a user, a TV tuner 24 having an input connected to terminal 16 for outputting one NTSC signal selected in response to an operation of the user among broadcasting waves input from the ground wave antenna, and a 4-input selection switch 32 having a first input terminal connected to terminal 12, a second input terminal connected to the MUSE signal output terminal of BS tuner 20, and the other two input terminals with no input. Connected to the output of switch 32 is the input of MUSE/NTSC signal processing circuit 22 for converting the input MUSE signal into the NTSC signal for output and if the input signal is the MUSE signal, for outputting a determination signal representing that.

The magnetic recording/reproducing apparatus further includes a selector 34 having one input connected to MUSE/NTSC signal processing circuit 22 and the other to the output of the NTSC signal of BS tuner 20 for selectively outputting one of the two inputs based on the value of the determination signal output from MUSE/NTSC signal processing circuit 22, and a 4-input input selection switch 36 having first and second input terminals connected to the determination signal output of MUSE/NTSC signal processing circuit 22 and the other two input terminals with no input, and an input selection switch 38 having first and second input terminals connected to the output of selector 34, a third input terminal connected to the output of TV tuner 24, and a fourth input terminal connected to terminal 18. Input selection switches 32, 36, and 38 cooperate in response to the operation of the user.

Magnetic recording/reproducing apparatus 10 further includes a recording/reproducing circuit 28 of NTSC standard having an input connected to the output of input selection switch 38 for recording an input video signal on a magnetic tape utilizing heads (not shown) and reproducing the signal, a determination signal encoder/decoder having an input connected to the output of input selection switch 36 for superimposing an applied determination signal on a video signal to be recorded in accordance with the determination signal at the time of recording the video signal, decoding a reproduction signal applied from recording/reproducing circuit 28 and extracting the determination signal at the time of reproduction, a recording/reproducing switch 42 having one input connected to the output of recording/reproducing circuit 28 and the other to the output of input selection switch 38, and a recording/reproducing switch 40 having one input connected to the output of determination signal encoder/decoder 26 and the other to the output of input selection switch 36. Recording/reproducing switches 40 and 42 simultaneously switch their input in response to the operation of the user. At the time of recording, for example, switches 40 and 42 selectively output the output of switch 36 and the output of switch 38, respectively. At the time of reproduction, switches 40 and 42 selectively output the output of determination signal encoder/decoder 26 and the output of recording/reproducing circuit 28, respectively.

A selector 44 operating in response to the determination signal output from recording/reproducing switch 40 is connected to the output of recording/reproducing switch 42. Vertical filter 30 is connected to one output of selector 44. Vertical filter 30 subjects the recorded video signal whose standard has been converted by MUSE/NTSC signal processing circuit 22 or a video signal directly applied after its standard being converted, to processing such as thinning of scan lines, interpolation and the like, and outputs a video signal representing an image removed of a deformation provided to the original image at the time of standards conversion. Vertical filter 30 converts the standard-converted video signal into the form of a side-cut picture frame C or an entire picture frame display D shown in FIG. 2. An aspect ratio selection switch 46 selects one of the two video signals output from vertical filter 30 and applies the selected one to one input of selector 48. The other input of selector 48 is connected to the output terminal of selector 44 which is not connected to vertical filter 30. Selectors 44 and 48 operate both in response to the determination signal output from switch 40. The output of selector 48 is applied to a television receiver 50 for display.

The following Table 1 shows how switches 32, 36, 38, 40, 42, 46 and selectors 34, 44, 48 are switched in response to respective operational modes.

TABLE 1

|  |  | MUSE | | | | NTSC | | | | |
|  |  | External | | BS | | BS | | Ground | | External | |
|  |  | Rec | PB | Rec | PB | Rec | PB | Rec | PB | Rec | PB |
| Switch | 32 | a | x | b | x | b | x | c | x | d | x |
|  | 36 | a | x | b | x | b | x | c | x | d | x |
|  | 38 | a | x | b | x | b | x | c | x | d | x |
| Switch | 40 | Rec | PB | Rec | PB | Rec | PB | Rec | PB | Rec | PB |
|  | 42 | Rec | PB | Rec | PB | Rec | PB | Rec | PB | Rec | PB |
| Selector | 34 | a | x | a | x | b | x | x | x | x | x |
|  | 44 | b | b | b | b | a | a | a | a | a | a |
|  | 48 | b | b | b | b | a | a | a | a | a | a |

Figure 4:
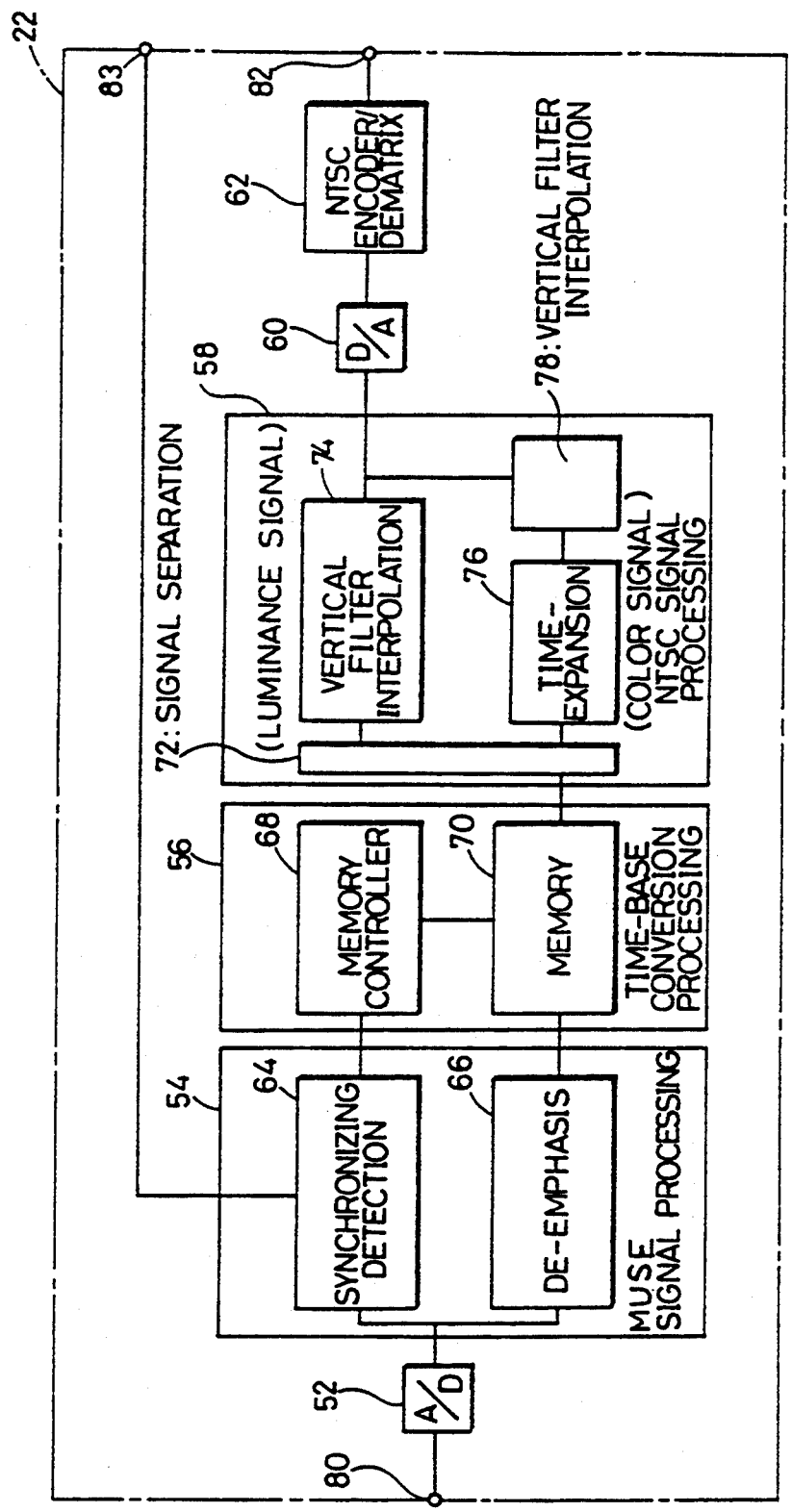
FIG. 4 is a block diagram showing a MUSE/NTSC signal processing circuit.

Referring to FIG. 4, MUSE/NTSC signal processing circuit 22 includes a terminal 80 for receiving the MUSE signal applied from switch 32, an A/D (analog-to-digital) converter 52 for converting the input analog MUSE signal into a digital signal, a MUSE signal processing circuit 54 for performing a signal processing of High Vision (high definition) scheme to the digitized MUSE signal and outputting a determination signal, a time-base conversion processing circuit 56 for performing time-base conversion into the NTSC standard to the MUSE video signal which has been subjected to the MUSE signal processing, and an NTSC signal processing circuit 58 for performing an NTSC signal processing to the video signal which has been subjected to the time-base conversion into the NTSC standard. Connected to the output of NTSC signal processing circuit is the input of a D/A (Digital-Analog) converter 60 for converting the digital signal output from NTSC signal processing circuit 58 into an analog signal. MUSE/NTSC signal processing circuit 22 further includes an NTSC encoder/dematrix circuit 62 for encoding the NTSC signal converted into the analog signal by D/A converter 60 and outputting the encoded signal as an NTSC signal, and an NTSC signal output terminal 82 connected to the output of circuit 62. The determination signal output from MUSE signal processing circuit 54 is output from a terminal 83.

MUSE signal processing circuit 54 includes a synchronizing detection circuit 64 for detecting a synchronizing signal from the input digital signal, detecting the input video signal being a MUSE signal and outputting the determination signal, and a de-emphasis circuit 66 for performing a de-emphasis processing to the input MUSE signal.

Time-base conversion processing circuit 56 includes a memory 70 for storing the digitized MUSE signal output from the de-emphasis circuit 66, and a memory controller 68 for writing and reading the signal to/from memory 70 each at a prescribed speed, thus outputting a time-base-converted video signal, in response to a clock signal output from synchronizing detection circuit 64.

NTSC signal processing circuit 58 includes a signal separation circuit 72 for separating the signal output from memory 70 into a luminance signal and a color signal, a circuit 76 for expanding the time base of the color signal, and vertical filter interpolation circuits 74 and 78 for performing a signal processing to adjust the luminance signal and color signal to match the NTSC specification.

The above-described MUSE signal processing circuit 54 has been implemented in accordance with the invention. Similarly, time-base-conversion processing circuit 56, and NTSC signal processing circuit 58 have been implemented in practice in LSI constructions. However, MUSE signal processing circuit 54 should output the determination signal and therefore requires the following modification.

Figure 5:
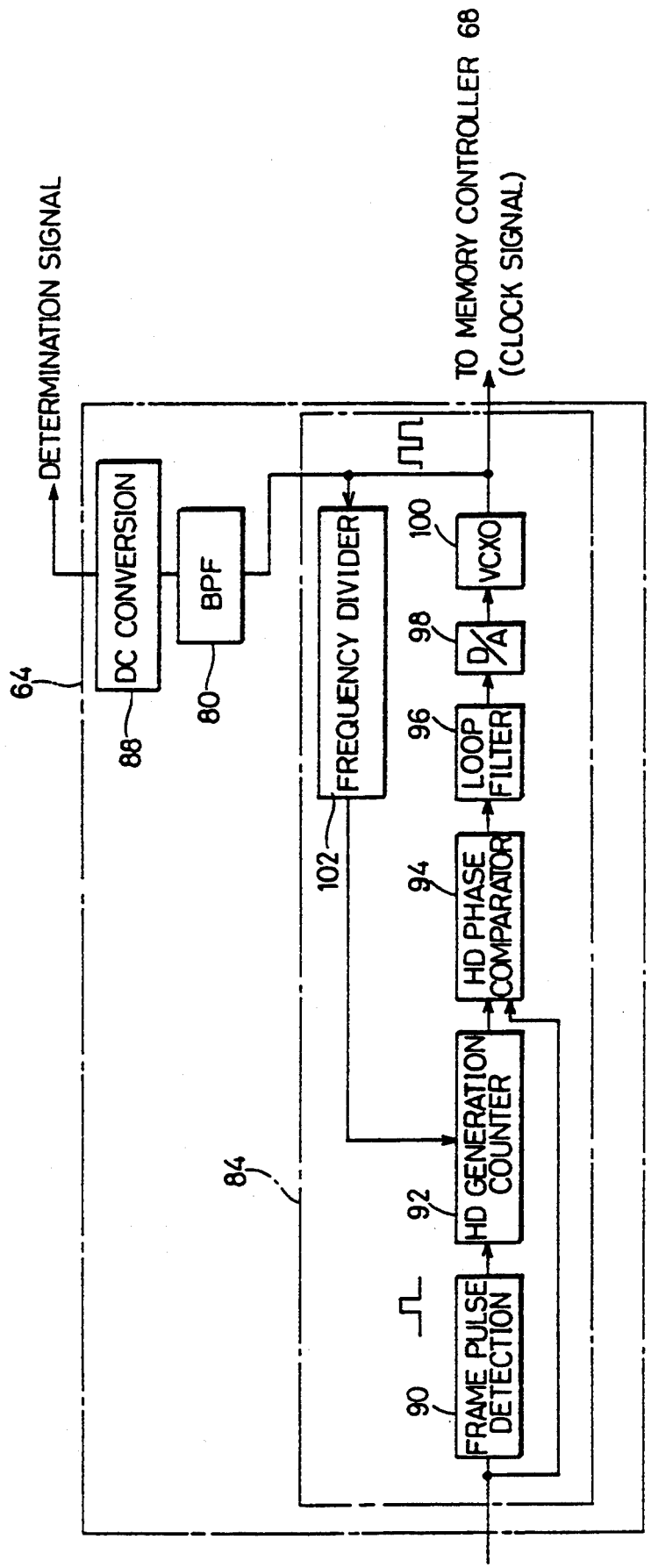
FIG. 5 is a block diagram showing a synchronizing detection circuit.

Referring to FIG. 5, synchronizing detection circuit 64 used in the video signal magnetic recording/reproducing apparatus according to the invention includes a PLL (Phase Locked Loop) circuit 84 for outputting a clock signal to be supplied to the memory controller in response to the MUSE signal, a bandpass filter (BPF) 86 for passing only a desired clock frequency of the clock signal output from PLL circuit 84, and a DC conversion circuit 88 for converting the clock signal output from BPF 86 into a DC signal for output as a determination signal.

PLL circuit 84 includes a frame pulse detection circuit 90 for detecting a frame pulse present in the first portion of one frame of the MUSE signal, an HD generation counter 92 for generating an internal horizontal synchronizing signal (HD) based on the detected frame pulse, an HD phase comparators 94 for detecting the phase difference between the internal HD output from HD generation counter 92 and the input HD point, a loop filter 96 and a D/A converter 98 for controlling a VCXO100, thereby permitting generation of a clock signal following the input MUSE signal, and a frequency divider 102 for dividing the frequency of the clock signal output from VCXO100 in a prescribed dividing ratio and applying the resultant signal to HD generation counter 92, thereby operating HD generation counter 92.

Figure 6:
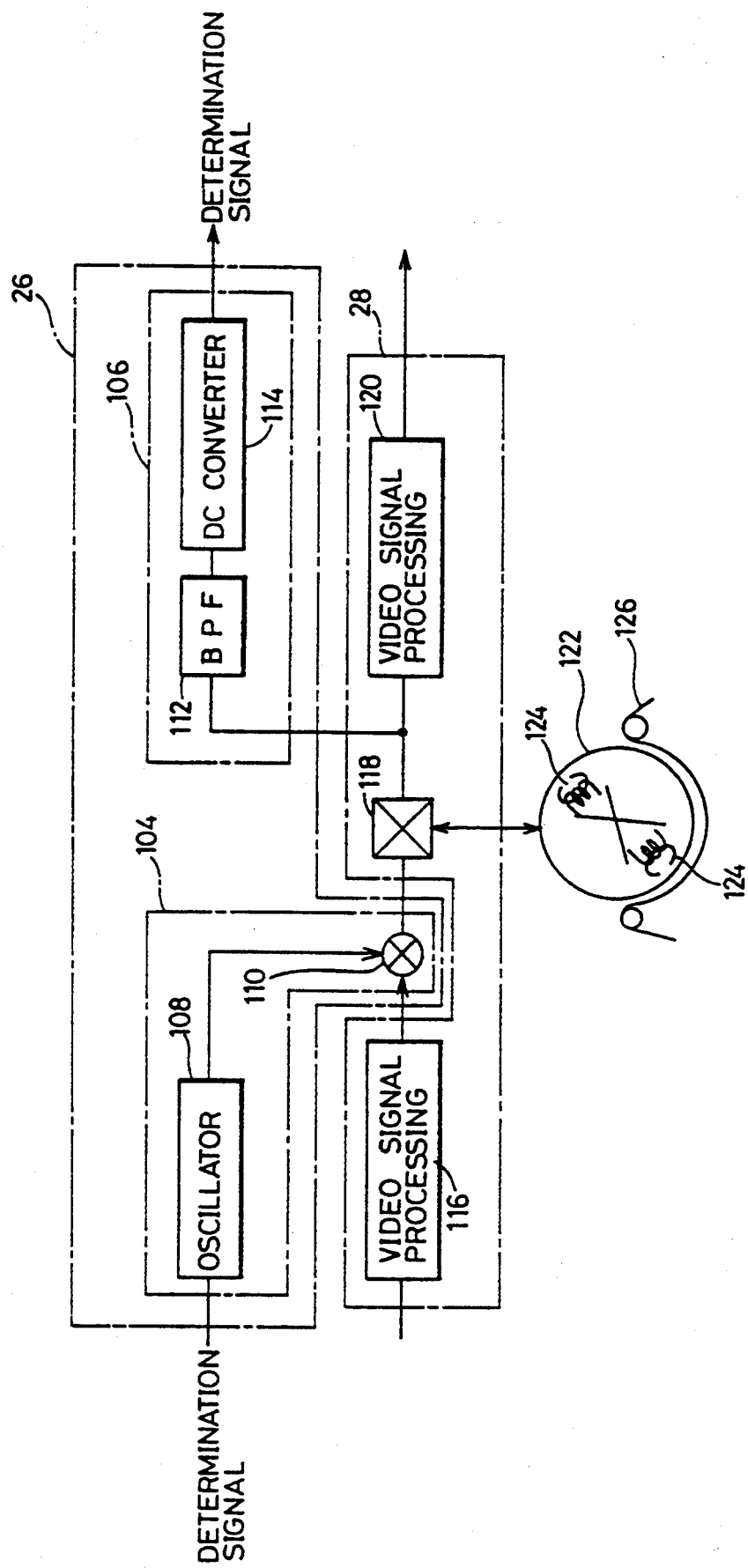
FIG. 6 is a block diagram showing a determination signal encoder/decoder and a recording/reproducing circuit.

Referring to FIG. 6, determination signal encoder/decoder 26 and recording/reproducing circuit 28 shown in FIG. 3 have the following construction. The determination signal encoder/decoder of the embodiment records a determination signal on a video signal or on an FM audio signal in a frequency multiplexed manner, and a decoder 106 for extracting the determination signal from the reproduced video signal.

Encoder 104 includes an oscillator 108 for generating a single sine wave voltage of a prescribed frequency only when the determination signal is at a prescribed value, in response to the input digital determination signal, a multiplexer 110 for multiplexing the video signal by the sine wave voltage generated from oscillator 108. The oscillation frequency of oscillator 108 is so selected that the signal does not give any effect on the video signal. For example, if recording/reproducing circuit 28 is of VHS system, the pilot tone frequency fp needs only to satisfy the following equation:

$$fp = \tfrac{1}{2} \cdot n \cdot fh$$

where n is a positive integer, and fh is a horizontal frequency. n=80 cannot be used, because 80 is used as a carrier wave of a color signal. At that time, fp is 629 KHz. Accordingly, the simplest value for the frequency of oscillator 108 is other than 629 KHz and below 600 KHz which does not overlap the band of the luminance signal, for example 550 KHz (n=70).

Decoder 106 includes a BPF12 for passing only the frequency component of the above-stated 550 KHz in a reproduction video signal output from recording/reproducing circuit 28, and a DC converter 114 for converting an AC signal output from BPF 112 into a DC signal and outputting the signal as a determination signal.

Recording/reproducing circuit 28 includes a video signal processing circuit 116 for performing a video signal processing at the time of recording, to the video signal applied from switch 38 shown in FIG. 3, a rotary transformer 118 for applying the video signal produced by encoding the determination signal by multiplexer 110 to the heads 124 of rotary drum 122 and coupling video signals alternately reproduced from heads 124 to make one video signal, and a video signal processing circuit 120 for performing a signal processing for reproduction to the video signal output from rotary transformer 118.

Figure 7:
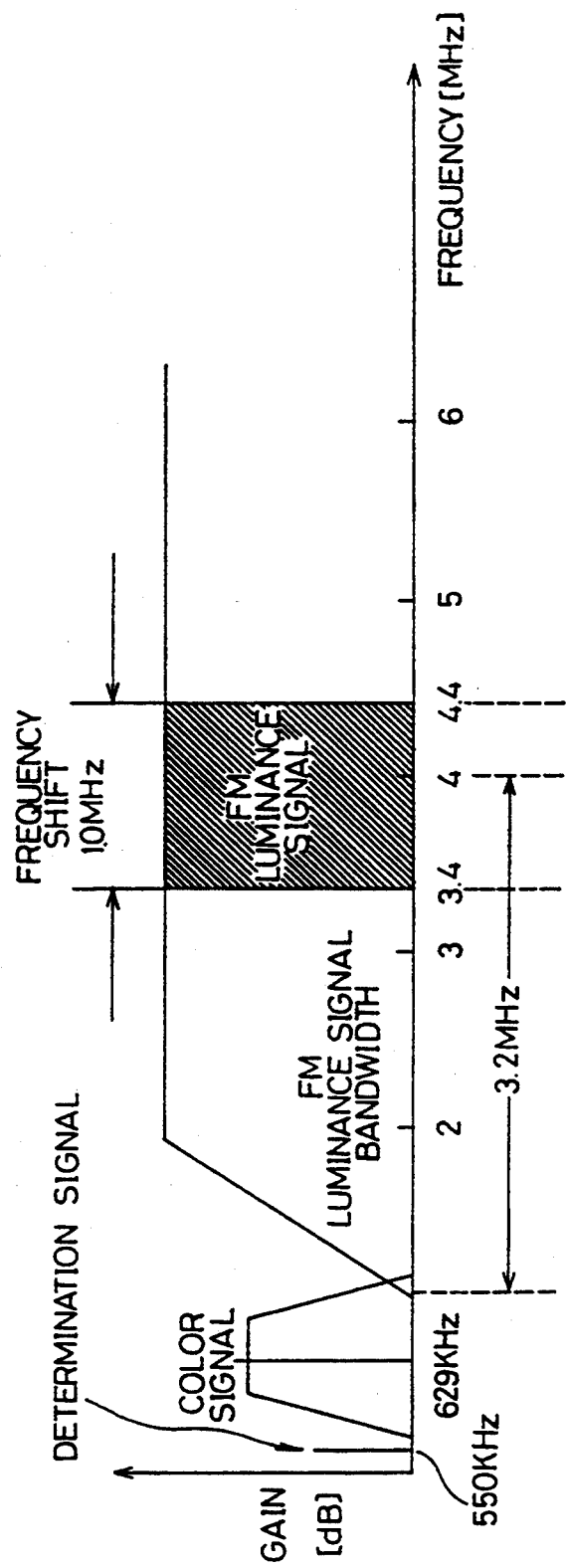
FIG. 7 is a representation of frequency allocation showing a region which can be selected by a determination signal.

The oscillating frequency 550 KHz of oscillator 108 is interposed as a video signal in a gap which is not used, as illustrated in FIG. 7.

Figure 1:
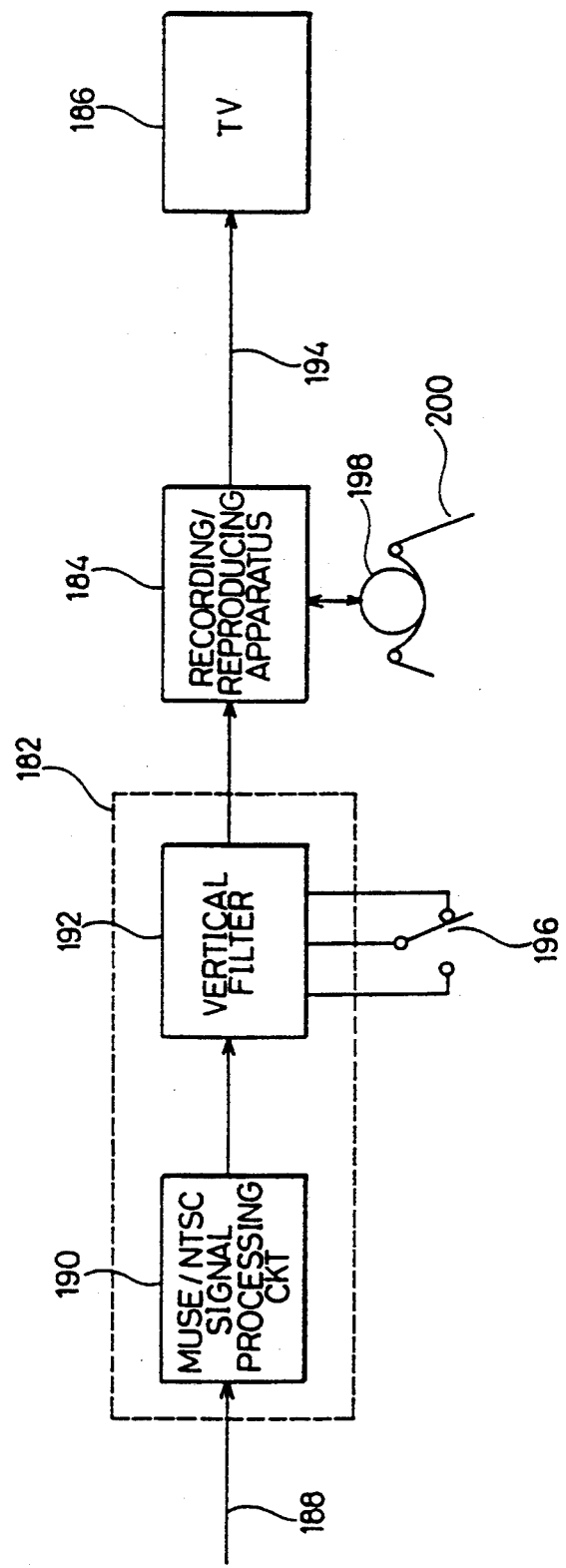
FIG. 1 is a block diagram schematically showing a conventional video signal recording/reproducing apparatus.
Figure 2:
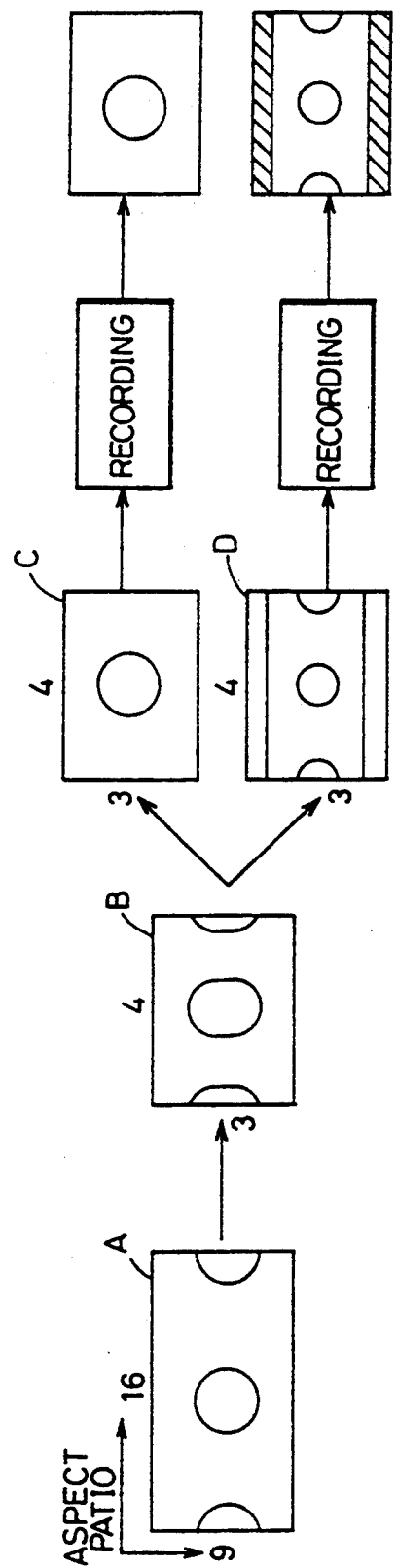
FIG. 2 is a representation schematically showing forms of picture frames produced by conversion between television standards.
Figure 8:
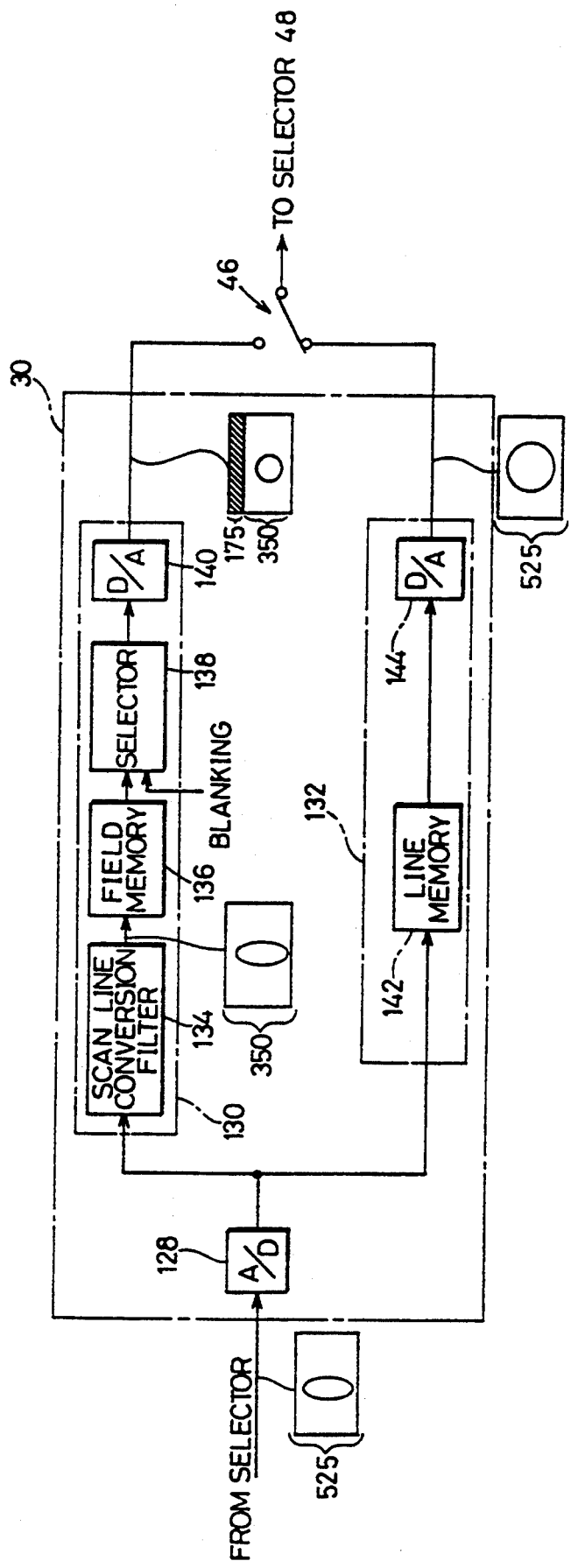
FIG. 8 is a block diagram schematically showing a vertical filter.

Referring to FIG. 8, vertical filter 30 includes an A/D converter 128 for converting an analog video signal applied from selector 44 into a digital signal, an entire picture frame video circuit 130 for outputting an NTSC signal in the form of the entire picture frame display D shown in FIG. 2 by performing a prescribed processing to the digital video signal output from A/D converter 128, and a side-cut video circuit 132 for outputting a video signal in the form of the side-cut picture frame C shown in FIG. 2 by performing a prescribed signal processing to the digital video signal output from A/D converter 128.

Entire picture frame video circuit 130 includes a scan line conversion filter 134 for converting the number of scan lines to 350 without changing the frame of a picture by performing a processing such as thinning and interpolation to the video signal (having 525 scan lines) output from A/D converter 128, a field memory 136 of FIFO type for time-compressing the scan lines converted into 350 in the direction vertical to the 350 scan lines of a usual NTSC signal, a selector 138 for interpolating 175 blanking lines in order to supply the image of NTSC video signal with the 175 scan lines which has been lost by the time-compression, and a D/A converter 140 for converting the digital video signal output from selector 138 into an analog signal and outputting the same to one of the inputs of switch 46.

Side cut video circuit 132 includes a 1H (horizontal scan line) line memory of FIFO type 142 for storing only the part to be used as a side cut video image of the digital video signal for one horizontal scan line output from A/D converter 128 and outputting the stored signal for time corresponding to one horizontal scan line, thereby performing time-extension, and a D/A converter 144 for converting the digital video signal output from line memory 142 into an analog signal and applying the analog signal to the other input terminal of switch 46.

Figure 9:
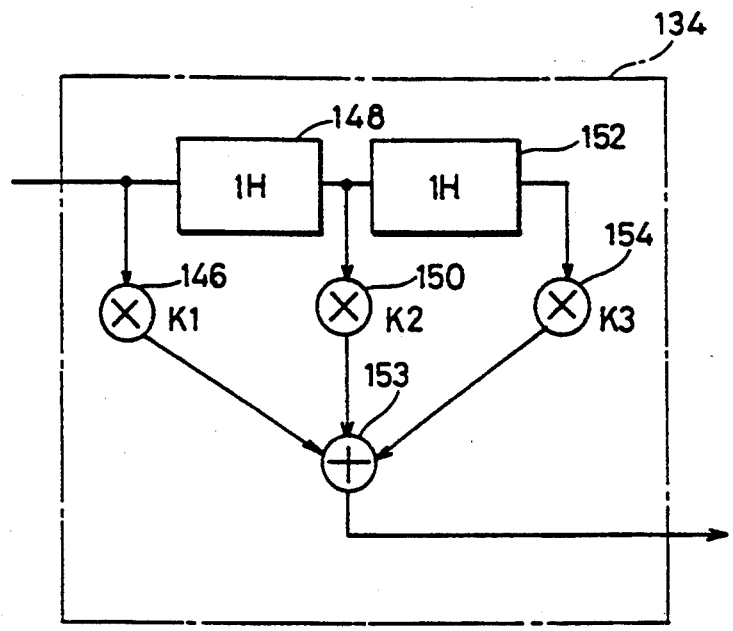
FIG. 9 is a block diagram schematically showing a scan lien conversion filter.

Referring to FIG. 9, scan line conversion filter 134 includes a 1H line memory 148 having an input connected to the output of A/D converter 128, and a 1H line memory 152 having an input connected to the output of line memory 148. Both of line memories 148 and 152 are of FIFO type, and both delay an input signal by 1H for output. Scan line conversion filter 134 further includes multipliers 146, 150, and 154 having inputs connected to the outputs of A/D converter 128, line memory 148, and line memory 152, respectively, and an adder 156 for adding up the outputs of multipliers 146, 150 and 154.

The respective coefficients K1, K2, and K3 of multipliers 146, 150 and 154 are switched on a line basis as follows.

Figure 10:
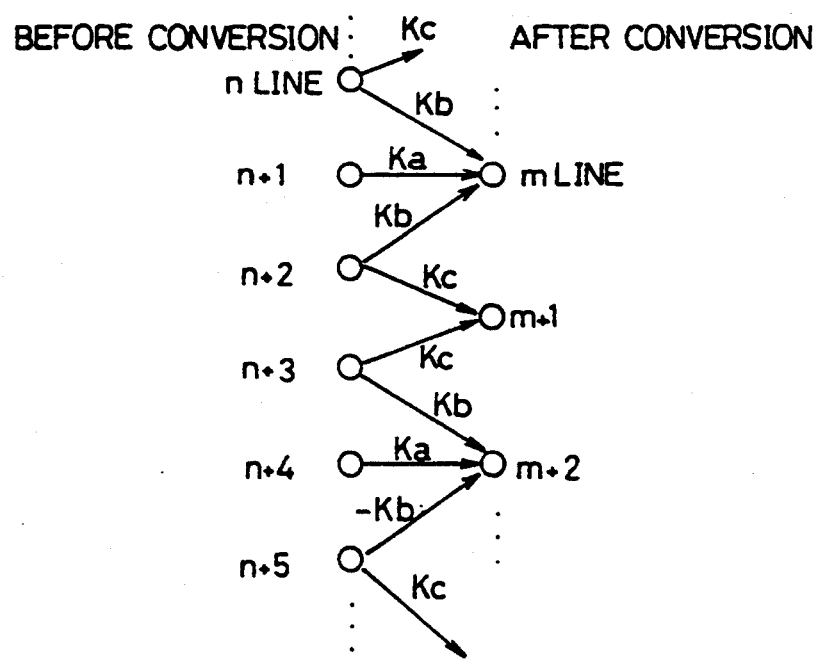
FIG. 10 is a representation schematically showing a scanning conversion processing.

Referring to FIG. 10, m lines after conversion is provided by multiplying n lines, n+1 lines, and n+2 lines before the conversion by coefficients Kb, Ka and Kb, respectively and adding up the results. m+1 lines after the conversion is produced by multiplying n+2 lines and n+3 line before the conversion both by coefficient Kc and adding up the results. n+2 lines is produced by multiplying n+3, n+4, and n+5 lines before conversion by Kp, Ka and Kb, respectively and adding up the results. Referring to FIG. 9, when the video signal in the m-th line is to be produced, let K1 and K3 both be Kb and K2 be Ka. If the (m+1)-th line is to be obtained, let K1 and K2 both be Kc and K3 be 0. In order to obtain the (m+2)-th line, the same operation as the case of the m-th line is performed. By switching between coefficients K1-K3, 520 scan lines are reduced to 350 scan lines.

Now, referring to FIGS. 3-13 and the above-described Table 1, the operation of magnetic recording-/reproducing apparatus according to one embodiment of the invention will be described for every mode.

(1) External MUSE Signal (a) Recording

At the time of recording, each of switches 32, 36 and 38 selects an input from a first input terminal (a). Switches 40 and 42 both switch the connection of the circuit to the side of recording (Rec). Selector 34, and selectors 44 and 48 select the first terminal (a) and the second terminals (b), respectively.

Figure 11:
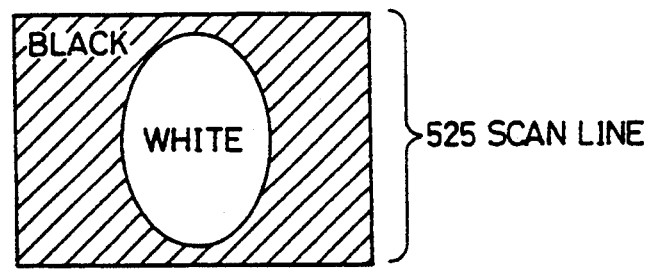
FIG. 11 is a representation schematically showing an image represented by an NTSC signal which has been converted from a MUSE signal.
Figure 12:
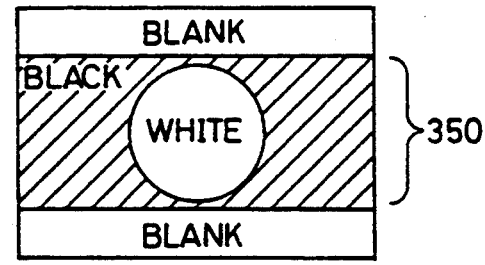
FIG. 12 is a representation schematically showing an entire picture frame display.
Figure 13:
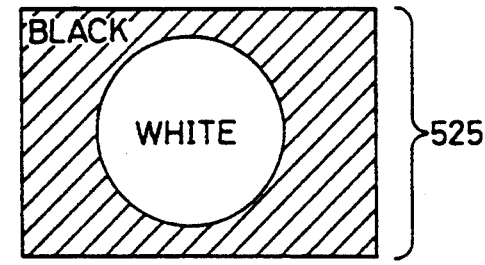
FIG. 13 is a representation schematic showing a side-cut picture frame.

An external MUSE signal input from terminal 12 is applied to MUSE/NTSC signal processing circuit 22 by switch 32. MUSE/NTSC signal processing circuit 22 converts the input MUSE signal into an NTSC signal and applies the resultant signal to selector 34. At that time, since MUSE/NTSC signal processing circuit 22 conducts conversion of the aspect ratio of the video signal, the wide aspect video image represented by the original video signal becomes a longwise video image as shown in FIG. 11. FIG. 11 shows at (a) an output video image from circuit 22 when the original image with a white region of a true circle in the center of the picture frame is standard-converted into an NTSC signal. In the synchronizing detection circuit 64 of MUSE/NTSC signal processing circuit 22, since the input signal is the MUSE signal, a clock signal of a prescribed frequency is output from PLL circuit 84 and applied to memory controller 68 and BPF 86. BPF 86 passes the clock signal and applies the signal to DC converter 88. The clock signal is converted into a DC signal by DC converter 88 and applied to the first input terminals (a) of switches 36 and 38 as a determination signal. The value of determination signal at that time is in an H level. Selector 34 selects an input from circuit 22 in response to the determination signal.

The determination signal is applied to determination signal encoder/decoder 26 via switch 36. The determination signal is also applied to selectors 44 and 48 through switch 40, and selectors 44 and 48 select inputs from respective second input terminals (b) in response to the determination signal.

Meanwhile, the video signal standard-converted into NTSC signal is applied to recording/reproducing circuit 28 via selector 34 and switch 38. Video signal is also applied to vertical filter 30 via switch 42 and selector 44.

Referring to FIG. 6, oscillator 108 is provided with an H level signal as a determination signal. Oscillator 108 oscillates the above-described 550 KHz single sine wave voltage and applies the same to multiplexer 110.

Video signal producing circuit 116 performs a prescribed processing for recording of the input video signal and applies the result to multiplexer 110. Multiplexer 110 multiplexes the sine wave provided as the determination signal from oscillator 108 with the input video signal, and applies the result to rotary transformer 118. Rotary transformer 118 applies the applied video signal to the head 124 of rotary drum 122. Heads 124 record the video signal by alternately scanning the recording surface of tape 126.

The video signal converted into the NTSC signal is superimposed with the determination signal and recorded on the magnetic tape. The video signal to be recorded at that time includes substantially all the information contained in the original image. The video signal to be recorded does not include a useless region as in the conventional entire picture frame display D (FIG. 2). Accordingly, the video signal recording/reproducing apparatus records all the necessary information on the medium and still can increase recording efficiency.

Referring back to FIG. 3, the video signal applied to vertical filter 30 is applied to one terminal of switch 46 as a video signal for entire picture frame display (see FIG. 12) representing an image including 175 blanking lines by entire picture frame video image circuit 130 shown in FIG. 8. The video signal is also applied to the other input terminal of switch 46 as a video signal representing a side-cut picture frame produced by removing both sides of the original picture and time-extending the same in the horizontal direction. In either of the video signals, a deformation applied by circuit 22 to the video image of the originally input external MUSE signal has been removed. More specifically, what should be represented as a true circle in the video image by the original MUSE signal is represented as a true circle in any of the picture frames.

The user can freely select either the entire picture frame display or the side cut picture frame. The user switches switch 46 to apply one of the entire picture frame display and the side cut video image to television receiver 50 for display through selector 48.

(b) Reproduction

After the external MUSE signal is recorded on the magnetic tape, the following operation is performed in reproducing the recorded signal. As set forth in Table 1, the states of switches 32, 36 and 38 are arbitrary. Switches 40 and 42 both switch the connection of the circuit to the side of reproduction (PB). The state of selector 34 is also arbitrary.

Referring to FIG. 6, a video signal recorded on tape 126 is alternately reproduced by heads 124, combined into one signal at rotary transformer 118 and applied to a signal processing circuit 120 and a decoder 106. Video signal processing circuit 120 performs a prescribed processing for reproduction to the PB side terminal of switch 42. At that time, since a frequency of 550 KHz is selected as the one not affecting the video image for the determination signal as described above, no adverse effect is given to the display video image even if the determination signal is not removed.

BPF 112 of decoder 106 passes only the component of frequency 550 KHz in the reproduced video signal and applies the same to DC converter 114. DC converter 114 converts the AC component passed through BPF 112 into a DC signal for output as a determination signal. If the video signal recorded on tape 126 is an NTSC signal converted from a MUSE signal into an NTSC signal, the video signal has been superimposed with the signal of 550 KHz by oscillator 108. Therefore, in this case, there exists a component passing through BPF 112, and the determination signal output from DC converter 114 is in an H level.

Referring to FIG. 3, since the signal of H level is output from determination signal encoder/decoder 26, selectors 44 and 48 both switch the connection of circuit to the side of terminal b. Vertical filter 30, as described above, removes deformation from the video image deformed at the time of standards conversion, and outputs as an entire picture frame display shown in FIG. 12 or a side-cut picture frame shown in FIG. 13. The user selects one of the entire picture frame display and the side-cut picture frame, by operating switch 46 and applies the selected one to television receiver 50 for display through selector 48.

(2) Satellite Broadcasting MUSE

A MUSE signal is applied to terminal 14 (see FIG. 3) from a satellite broadcasting antenna and output from BS tuner 20, the following recording processing is performed. Switches 32, 36, and 38 each switch the connection of the circuit to the second terminal (b). Thus, the MUSE signal is applied to MUSE/NTSC signal processing circuit 22. As is the case with the external MUSE signal being input, MUSE/NTSC signal processing circuit 22 standard-converts the MUSE signal into an NTSC signal for application to selector 34. Similarly to the case of the input of the external MUSE signal, a determination signal of H level is output from MUSE/NTSC signal processing circuit 22.

Since the H level signal is output as a determination signal, selector 34 selects the signal from MUSE/NTSC signal processing circuit 22 and applies the signal to recording/reproducing circuit 28 through switch 38. Since determination signal encoder/decoder 26 is provided with the H level determination signal, the determination signal is superimposed on the video signal recorded on the magnetic tape through recording/reproducing circuit 28. Thus, the MUSE signal for satellite broadcasting is recorded on the magnetic tape. As with recording of the external MUSE signal, substantially all the information in the original picture frame is reserved by conversion of aspect ratio in a standards conversion processing performed in MUSE/NTSC signal processing circuit 22, but the video image itself is recorded as being deformed longwise.

A reproducing processing of the MUSE signal from satellite broadcasting recorded on the magnetic tape is the same as the case of reproducing the above-described external MUSE signal. Therefore, detailed description thereof will not be repeated here.

(3) NTSC Signal for Satellite Broadcasting (a) Recording

When a signal of NTSC standard received from satellite broadcasting is recorded, switches 32, 36 and 38 each switch the connection of the circuit to a third input terminal (c). Since MUSE/NTSC signal processing circuit 22 is not provided with any input signals, a determination signal output therefrom is in an L level. Thus, selector 34 selects an input through terminal (b).

The NTSC signal output from BS tuner 20 is applied to recording/reproducing circuit 28 through selector 34 and switch 38. Recording/reproducing circuit 28 records the NTSC signal on a magnetic tape. In this case, since no determination signal is input to determination signal encoder/decoder 26, a determination signal of a prescribed frequency will not be superimposed on a video signal to be recorded by determination signal encoder/decoder 26.

(b) Reproduction

Reproduction of NTSC signal recorded on the magnetic tape is performed as follows. The states of switches 32, 36 and 38 are arbitrary. The state of selector 34 is also arbitrary. Switches 40 and 42 both switch the connection of the circuit to the side of reproduction (PB). Aspect ratio selection switch 46 is switched to one of an entire picture frame display or a side cut picture frame depending upon a selection by the user.

Recording/reproducing circuit 28 reproduces the video signal from the magnetic tape and applies the reproduced signal to selector 44 through switch 42. In this case, since no determination signal is superimposed on the reproduced video signal, a determination signal output from determination signal encoder/decoder 26 is in an L level. The L level determination signal is applied to selectors 44 and 48 through switch 40. Selectors 44 and 48 both select terminal (a) in response to the determination signal. Accordingly, the reproduced video signal is directly applied through selectors 44 and 48 (not through vertical filter 30) to television receiver 50 for display. In this case, since the signal to be recorded is originally the NTSC signal, the video image is not added with any deformation. Therefore, the direct application of the signal to the television receiver for display can produce a correct original video image.

(4) Ground NTSC Signal and External NTSC Signal (a) Recording

Switches 32, 36, and 38 each switch the connection of the circuit to third input terminal (c) when an NTSC signal input from a ground wave antenna is to be recorded. These switches each switch the connection of the circuit to a fourth input terminal (d) when an external NTSC signal is recorded. A determination signal of L level is output from MUSE signal/NTSC signal processing circuit 22. Except for that point, it is the same as recording of the NTSC signal from satellite broadcasting. Therefore, detailed description will not be repeated here.

(b) Reproduction

The operation of video signal magnetic recording/reproducing apparatus 10 at the time of reproduction is entirely the same as the case in a which a tape recorded with an NTSC signal from satellite broadcasting is reproduced. Therefore, detailed description thereof will not be repeated here.

As in the foregoing, according to the video signal recording/reproducing apparatus, a MUSE signal is standard-converted into an NTSC signal and recorded on a magnetic tape. At that time, although the video image is subjected to a deformation due to conversion of aspect ratio, substantially all the information is recorded on the magnetic tape. At the time of reproduction, the video image is displayed as an entire picture frame display or a side cut display utilizing vertical filter 30, a correct video image can be produced. Unlike the case in which a side-cut picture frame is recorded, the disability of reproducing a part of the picture frame at the time of reproduction can be avoided. Furthermore, the entire picture frame display can be performed by switching vertical filter 30, and therefore the user can fully enjoy a high definition television signal by the MUSE signal.

As compared to a conventional way of recording a video signal for an entire picture frame display on a magnetic tape, portions corresponding to blanking lines do not have to be recorded and therefore recording efficiency can be improved.

Figure 14:
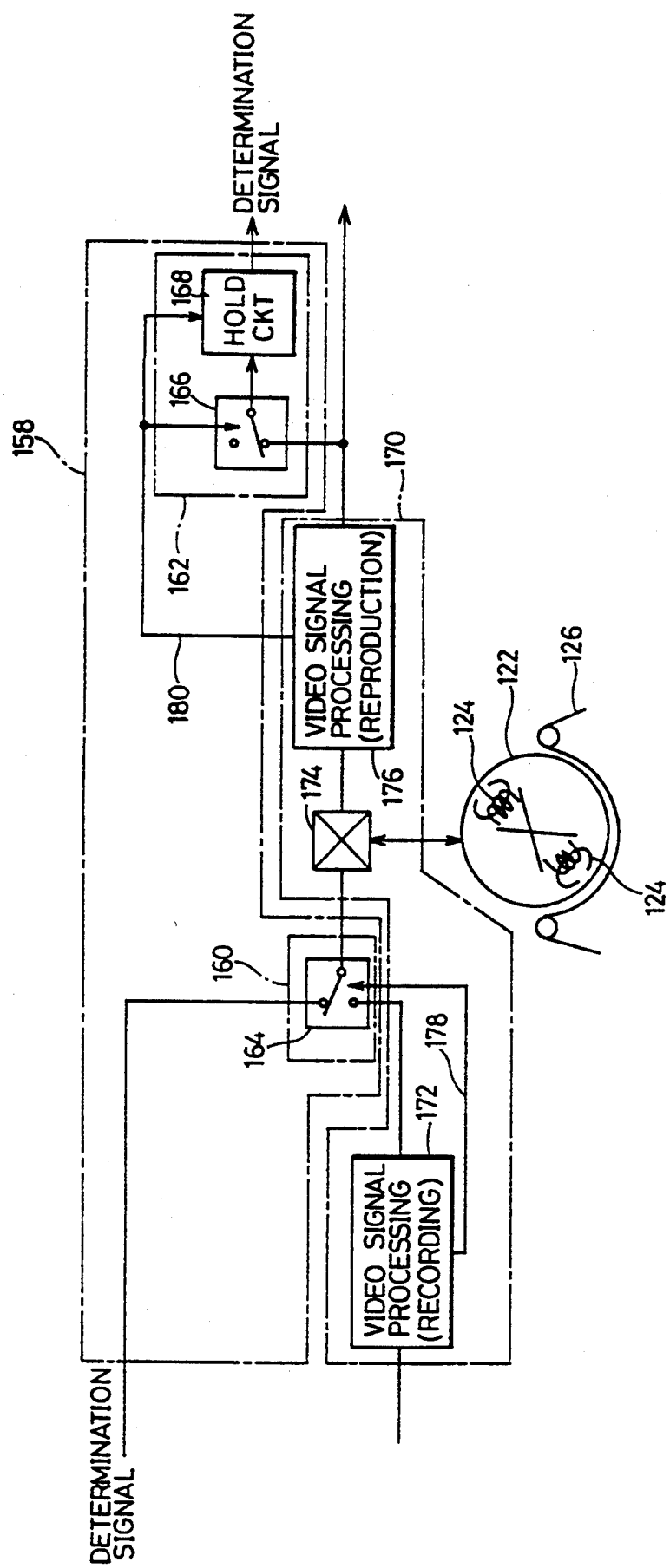
FIG. 14 is a block diagram showing a determination signal encoder/decoder and a recording/reproducing circuit for use in a video signal recording/reproducing apparatus according to a second embodiment of the invention.

In the first embodiment, the determination signal encoder/decoder is illustrated which frequency-multiplexes a sine wave of a prescribed frequency in a video signal and extracts it utilizing a BPF at the time of reproduction. However, the invention is not limited thereto, and a so-called time-division multiplex approach which superimposes a determination signal in a certain part of the video signal may be utilized. FIG. 14 shows one example of such a determination signal encoder/decoder. This determination signal encoder/decoder can be employed for the first embodiment in place of the encoder/decoder 26 of the first embodiment.

Referring to FIG. 14, a determination signal encoder/decoder 158 utilizing time-division-multiplex in the video signal magnetic recording/reproducing apparatus according to a second embodiment includes an encoder 160 formed of a selector 164, and a decoder 162 for extracting a determination signal from a prescribed part of the reproduced video signal and holding it to output.

Meanwhile, a recording/reproducing circuit 170 used for the video signal magnetic recording/reproducing apparatus according to the second embodiment includes a video signal processing circuit 172 for performing a signal processing for recording to an applied video signal and applying the processed signal to one input terminal of selector 164, a rotary transformer 174 for alternately applying a video signal time-division multiplexed with the determination signal to the heads 124 of rotary drum 112 to be recorded on a magnetic tape 162 and combining video signals alternately reproduced by heads 124 into one signal for output at the time of reproduction, and a video signal processing circuit 176 for performing a signal processing for reproduction to a reproduction video signal output from rotary transformer 174 and applying the resultant signal to an input terminal on the reproduction side of switch 42 as illustrated in FIG. 3.

Video signal processing circuit 172 counts a horizontal synchronizing signal in the vertical blanking period of an input NTSC signal and controls selector 164 to switch the connection of the circuit to the input of the determination signal only during the 10H-th period. In other periods, selector 164 selects a video signal output from video signal processing circuit 172 and applies the selected one to rotary transformer 174. For signal of the existing NTSC standard, there are lines which are not used for a video image during the 10H-th– 20H-th periods. In any of the 10H-th–20H-th periods (in the 10H-th period in the case of the present embodiment), the H level or L level of the determination signal is recorded and time-division multiplexer is performed.

Similarly, video signal processing circuit 176 outputs an extraction control signal 180 and applies the same to decoder 162 during the 10H-th period in the vertical blanking period of the signal being reproduced.

Decoder 162 has a selector 166 having one input connected to the output of video signal processing circuit 176 and the other without being supplied with any input, and a hold circuit 168 for holding the output of selector 166 until the 10H-th period of the vertical blanking period in the next field.

Decoding of a determination signal at the time of reproduction is performed as follows. Video signal reproducing circuit 176 outputs the extracting control signal 180 as described above during the 10H-th period of each field of the reproduction video signal. The selector 166 of decoder 162 usually connects the circuit to the terminal with no input applied, but selects the output of video signal processing circuit 176 and applies the same to hold the circuit 168 during the period in which the extraction control signal 180 is present. The hold circuit 168 holds the output of selector 166 in synchronization with the extraction control signal 180, holds the same until the 10H-th period in the vertical blanking period in the next field and outputs the held signal as a determination signal. Therefore, the value of the signal output from hold circuit 168 is in an H level when the determination signal written in the 10H-th period in the vertical blanking period of the video signal to be reproduced is in an H level, and in an L level when the determination signal is in an L level. More specifically, it can be determined from the value of the determination signal whether or not the reproduction video signal has been standard-converted from a MUSE signal.

In FIG. 15 at (a), a waveform of a video signal to be recorded in its vertical blanking period when the video signal to be recorded is not the one which has been converted from MUSE to NTSC is illustrated. As illustrated in FIG. 15 at (a), the 10H-th period is in the L level. It can readily understood that if the signal is reproduced, the L level is extracted as a determination signal.

In FIG. 15 at (b), a waveform chart of a signal to be recorded which has been converted from MUSE to NTSC standard during a vertical blanking period is set forth. As illustrated in FIG. 15 at (b), in this case, in the 10H-th period during the vertical blanking period, an H level determination signal is written. Accordingly, by reproducing this signal and holding the value in the 10H-th period in the vertical blanking, a determination signal of an H level is to be extracted.

As in the foregoing, recording to the video signal magnetic recording/reproducing apparatus according to the second embodiment, as is the case with the magnetic recording/reproducing apparatus of the first embodiment, a MUSE signal is converted into an NTSC signal and can efficiently be recorded, and the user can enjoy a video image removed of deformation. Furthermore, substantially all the information carried by the original MUSE signal is preserved in the magnetic tape. Therefore, the entire picture frame can be confirmed and enjoyed, if necessary, by performing an entire picture frame display. As in the foregoing, according to the invention, a signal of a first television standard is converted into a signal of a second television standard having a different aspect ratio from the first standard and recorded with a deformation of the image, and thus substantially all the information of the original image can be preserved. Furthermore, since the deformation of the image is removed at the time of reproduction, a correct video image can be displayed. Since blank lines or the like are not included in the recorded video image, the recording efficiency of a recording medium can be improved as compared to conventional apparatuses.

It is determined whether a video signal to be recorded is a video signal of the second television standard converted from the first television standard or originally a signal of the second television standard, and a determination signal representing the kind of the signal is superimposed in the video signal to be recorded. At the time of reproduction, by extracting the determination signal, a video signal removed of the deformation by a vertical filter can be displayed in the case of a video signal of the first television standard converted including the deformation, and the correct image directly reproduced can be displayed otherwise.

Consequently, video signals of both first and second television standards can highly efficiently recorded with substantially all the information of the original image being recorded and reproduced in a correct form. Furthermore, even when the image of the video signal of the first television standard is deformed due to conversion of aspect ratio, that can be determined at the time of reproduction and display can be made in a correct form.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal recording/reproducing apparatus comprising:
    standards conversion means having an input terminal and a first output terminal for converting a video signal of a television standard having a first aspect ratio applied to said input terminal into a video signal of a television standard having a second aspect ratio different from said first aspect ratio so that substantially no drop out and no empty space is generated in a video image represented by the converted video signal and for outputting the converted video signal through said first output terminal;
    the converted video signal output from said standards conversion means including a deformation of the image resulting from a difference between the first and second aspect ratios;
    means having an input terminal connectable to said first output terminal of said standard conversion means for recording the converted video signal having said second aspect ratio applied to said input terminal on a recording medium and reproducing the signal from the recording medium; and
    image restoring means for restoring the correct video image represented by the converted video signal of the television standard having said second aspect ratio by processing the video signal reproduced by said recording/reproducing means, thereby removing said deformation of the image due to the difference in the aspect ratios, further comprising:
    first reception means capable of receiving both television broadcasting by the video signal of the television standard having said first aspect ratio and television broadcasting by the video signal of the television standard having said second aspect ratio for selectively outputting the video signal of the television standard having said first aspect ratio or the video signal of the television standard having said second aspect ratio to first or second output terminals, respectively; and
    means for connecting said first output terminal of said reception means to said input terminal of said standards conversion means.

2. An apparatus as recited in claim 1, wherein said standards conversion means includes,
    means for determining whether or not the video signal of the television standard having said first aspect ratio is applied to said input terminal, and outputting a determination signal to said first output terminal; and
    means for converting the video signal of the television standard having said first aspect ratio into the video signal of the television standard having the second aspect ratio different from the first aspect ratio so that substantially no drop out of the video image is generated and no empty space is generated in the video image and outputting the resultant signal through said second output terminal,
    said apparatus further comprising:
    first selection means for selecting one of the video signal output from said standards conversion means and the video signal output from said first reception means to said second terminal of said first reception means, in response to said determination signal;
    means for encoding said determination signal in the video signal having said second aspect ratio recorded on the recording medium by said recording/reproducing means, decoding the video signal reproduced from the recording medium by said recording/reproducing means and outputting said encoded determination signal; and
    second selection means for selectively and externally outputting one of the video signal output from said recording/reproducing means and the output of said image restoring means, in response to said determination signal output from said encode/decode means.

3. An apparatus as recited in claim 2, further comprising:
    a switch for generating a signal to designate one of a plurality of operational modes including recording and reproducing modes;
    third selection means for selectively applying to said second selection means one of the determination signal output from said standards conversion means and the determination signal output from said encode/decode means in response to said operational mode signal; and
    fourth selection means for selectively applying to said second selection means one of the video signal output from said standards conversion means and the video signal output from said recording/reproducing means, in response to said operational mode signal.

4. An apparatus as recited in claim 3, further comprising:
    first means for opening/closing the connection between said first output of said first reception means and the input terminal of said standards conversion means;
    second reception means separate from said first reception means for receiving broadcasting of the video signal having said first or second aspect ratio;
    second means for opening/closing the connection between said first output terminal of said standards conversion means and the input terminal of said encoder/decoder means; and
    fifth selection means for selectively applying to said recording/reproducing means one of the output of said second reception means and the output of said first selection means, wherein
said first and second means for opening/closing and said fifth selection means cooperates with each other.

5. An apparatus as recited in claim 4, wherein said first aspect ratio is selected to be larger than said second aspect ratio.

6. An apparatus as recited in claim 5, wherein said image restoring means includes,
first restoring means for restoring correctly the original image by processing the video signal having said second aspect ratio output from said fourth selection means and compressing the image only in the vertical direction,
second restoring means for correctly restoring a part of the original image by processing the video signal having said second aspect ratio output from said fourth selection means and utilizing only the image within a prescribed frame size, and
manually operable means for selectively applying to said second selection means one of the output of said first restoring means and the output of said second restoring means.

7. An apparatus as recited in claim 6, wherein said first aspect ratio is selected to be 16:9.

8. An apparatus as recited in claim 7, wherein said second aspect ratio is selected to be 4:3.

9. An apparatus as recited in claim 1, wherein said first aspect ratio is selected to be larger than said second aspect ratio.

10. An apparatus as recited in claim 9, wherein said image restoring means includes,
first restoring means for correctly restoring the original image by processing the video signal having said second aspect ratio output from said fourth selection means and compressing the image only in the vertical direction,
second restoring means for correctly restoring a part of the original image by processing the video signal having said second aspect ratio output from said fourth selection means and expanding the image only in the horizontal direction and utilizing only the image within a prescribed frame size, and
manually operable means for selectively externally outputting one of the output of said first restoring means and the output of said second restoring means.

11. An apparatus as recited in claim 10, wherein said first aspect ratio is selected to be 16:9.

12. An apparatus as recited in claim 11, wherein said second aspect ratio is selected to be 4:3.

13. An apparatus as recited in claim 1, further comprising time-base converting means for performing time-base conversion from said video signal of said television standard having said first aspect ratio to said video signal of said television standard having said second aspect ratio.

14. An apparatus as recited in claim 1, wherein said standards conversion means operates for converting a first format of said video signal having a first aspect ratio to a second format of said video signal having said second aspect ratio.

15. An apparatus as recited in claim 1, wherein said video signal of a television standard having a first aspect ratio includes a plurality of signals multiplexed therein.

16. An apparatus as recited in claim 1, wherein said standards conversion means converts a MUSE standard video signal to an NTSC standard video signal and outputs said NTSC standard video signal to said means for recording and reproducing, and
said means for recording and reproducing includes frequency division means for recording and reproducing the video signal on and from the recording medium.

17. An apparatus as recited in claim 1, wherein said reception means comprises means for receiving both an NTSC video signal and a MUSE video signal.

18. An apparatus as recited in claim 2, wherein said means for determining is connected to receive an NTSC video signal having said second aspect ratio and operates for determining whether to display a reproduced signal in said second aspect ratio or in said first aspect ratio in a display area having said second aspect ratio.

19. An apparatus as recited in claim 6, wherein said first restoring means functions for changing an aspect ratio of said video signal having said second aspect ratio output from said fourth selection means and for retaining a television standard thereof.

20. A video signal recording/reproducing apparatus comprising:
providing means for providing any of a plurality of video signals including at least a first video signal conforming to a first television standard having a first aspect ratio and a second video signal conforming to a second television standard having a second aspect ratio different from said first aspect ratio;
standards conversion means, having an input terminal connected to said providing means and a first output terminal, for converting a received first video signal having said first aspect ratio into a converted video signal having said second aspect ratio so that substantially no drop out and no empty space is generated in a video image represented by the converted video signal, and for outputting the converted video signal through said first output terminal,
the converted video signal output from said standards conversion means including a deformation of the video image represented thereby and resulting from a difference between the first and second aspect ratios;
recording/reproducing means having an input terminal connectable to said first output terminal of said standard conversion means for recording the converted video signal applied to said input terminal, having said second aspect ratio and said deformation, on a recording medium and for reproducing the converted video signal from the recording medium; and
vertical filter means for restoring a correct video image represented by a converted video signal conforming to the second television standard having said second aspect ratio by processing the converted video signal to remove said deformation resulting from the difference between the aspect ratios of the video image represented thereby, thereby to provide a deformation free image for display on a video display, and
first switch means connected to said first output of said standards conversion means and to an output of said recording/reproducing means for receiving the converted video signal reproduced thereby, for switchably providing one of said converted video signals, from said standards conversion means and reproduced by said recording/reproducing means, to said vertical filter means for removing said deformation therefrom for display on a video display.

21. An apparatus as recited in claim 20, wherein said switch means comprises further switch means for directly connecting said first output of said standards conversion means to said recording/reproducing means to provide the converted video signal from said standards conversion means, including said deformation of the video image represented thereby, to said recording/reproducing means for recording on the recording medium.

22. An apparatus as recited in claim 20, wherein said switch means comprises:
first switch means for directly connecting said first output of said standards conversion means to said recording/reproducing means to provide the converted video signal from said standards conversion means, including said deformation of the video image represented thereby, to said recording/reproducing means for recording on the recording medium;
second switch means for connecting said first output of said standards conversion means to said vertical filter means to remove the deformation of the video image represented thereby, and
third switch means for connecting the output of said vertical filter means to the video display,
said first, second and third switch means connected to operate for displaying a video image free of deformation while recording the converted video signal representing the video image and the deformation.

23. An apparatus as recited in claim 20, wherein said vertical filter means comprises:
first means for providing a vertical compression to the converted video image and a first output terminal for providing a first corrected video signal including said vertical compression of the video image,
second means for providing a horizontal expansion to the converted video image and a second terminal for providing a second corrected video signal including said horizontal expansion of the video image, and
additional switch means for switchably selecting one of said first and second output terminals of said vertical filter means to provide an output video signal.

24. A video signal recording/reproducing apparatus comprising:
standards conversion means having an input terminal and first and second output terminals, for converting a video signal of a television standard having a first aspect ratio applied to said input terminal into a video signal of a television standard having a second aspect ratio different from said first aspect ratio so that substantially no drop out and no empty space is generated in a video image represented by the converted video signal, and for outputting the converted video signal through said first output terminal,
said standards conversion means including detecting means for detecting whether or not the video signal applied to said input terminal is of the television standard having said first aspect ratio and for outputting to said second output terminal thereof a determination signal indicative of the detected television standard,
the converted video signal output from said standards conversion means including a deformation of the video image represented thereby resulting from a difference between the first and second aspect ratios;
recording/reproducing means having an input terminal connectable to said first output terminal of said standard conversion means for recording the converted video signal applied to said input terminal, having said second aspect ratio on and said deformation, on a recording medium and for reproducing the converted video signal from the recording medium; and
restoring means for restoring a correct video image represented by a converted video signal conforming to the second television standard having said second aspect ratio by processing the converted video signal to remove said deformation resulting from the difference in the aspect ratios thereby to provide a corrected video signal representing a deformation free video image.

25. An apparatus as recited in claim 24, further comprising means responsive to said determination signal for controlling inclusion and exclusion of said restoring means from a signal path for the video signal.

26. An apparatus as recited in claim 24, further comprising:
means for providing to said input terminal of said recording/reproducing means, as a video signal to be recorded on the recording medium, one of said converted video signal from said standard conversion means and another video signal,
multiplexing means for multiplexing said determination signal with the video signal to be recorded on the recording medium to provide a multiplexed signal to said recording/reproducing means,
said recording/reproducing means recording said multiplexed signal on the recording medium free of restoration by said restoring means.

27. An apparatus as recited in claim 24, wherein said recording/reproducing means further receives a signal corresponding to said determination signal and records on the recording medium both a video signal and said determination signal,
further comprising determination signal decoding means responsive to a determination signal included in a signal reproduced from the recording medium and outputted by said recording/reproducing means for generating a reproduced determination signal, and
switching means responsive to said reproduced determination signal for connecting a reproduced output from said recording/reproducing circuit to a video display directly or through said restoring means.

* * * * *